(12) United States Patent
Mohsenian

(10) Patent No.: US 7,924,915 B2
(45) Date of Patent: Apr. 12, 2011

(54) METHOD AND SYSTEM FOR ENCODING VIDEO DATA

(75) Inventor: Nader Mohsenian, Lawrence, MA (US)

(73) Assignee: Broadcom Corporation, Irvine, CA (US)

( * ) Notice: Subject to any disclaimer, the term of this patent is extended or adjusted under 35 U.S.C. 154(b) by 1811 days.

(21) Appl. No.: 11/046,445

(22) Filed: Jan. 28, 2005

(65) Prior Publication Data
US 2006/0171455 A1 Aug. 3, 2006

(51) Int. Cl.
*H04N 11/04* (2006.01)
*G06K 9/36* (2006.01)
(52) U.S. Cl. .................. 375/240.03; 382/236
(58) Field of Classification Search ........... 348/14.13, 348/14.08, 404, 405.1, 416.1, 414.1, 417.1, 348/418.1, 419.1, 422.1; 382/251, 236, 245, 382/246, 225, 168, 250, 248, 239, 238; 375/243, 375/240.2, 240.3, 240.03, 240.22, 244, 245, 375/240.12, 240.05, 240.17
See application file for complete search history.

(56) References Cited

U.S. PATENT DOCUMENTS

| | | | | |
|---|---|---|---|---|
| 5,565,920 A * | 10/1996 | Lee et al. | ................ | 375/240.11 |
| 5,835,149 A * | 11/1998 | Astle | ................ | 375/240.05 |
| 5,995,151 A * | 11/1999 | Naveen et al. | ........... | 375/240.24 |
| 6,931,159 B2 * | 8/2005 | Ridge | ................ | 382/246 |
| 7,460,597 B2 * | 12/2008 | Mihara | ................ | 375/240.05 |
| 2002/0034245 A1 * | 3/2002 | Sethuraman et al. | ..... | 375/240.03 |
| 2002/0136461 A1 * | 9/2002 | Tan | ................ | 382/232 |
| 2004/0091045 A1 * | 5/2004 | Chang et al. | ................ | 375/240.03 |
| 2004/0202247 A1 * | 10/2004 | Chang et al. | ................ | 375/240.03 |
| 2004/0264580 A1 * | 12/2004 | Chiang Wei Yin et al. | ................ | 375/240.25 |
| 2005/0084007 A1 * | 4/2005 | Lightstone et al. | ...... | 375/240.03 |
| 2006/0013298 A1 * | 1/2006 | Tong et al. | ................ | 375/240.03 |
| 2006/0129909 A1 * | 6/2006 | Butt et al. | ................ | 715/500.1 |

* cited by examiner

Primary Examiner — Behrooz Senfi
(74) Attorney, Agent, or Firm — McAndrews, Held & Malloy, Ltd.

(57) ABSTRACT

Described herein is a rate controller in a video system. The rate controller is comprised of a complexity estimator, a quantization level selector, a complexity generator, and a complexity estimate updater. The complexity estimator generates a complexity metric estimate. The quantization level selector sets a quantization level based on the complexity metric estimate. The complexity generator generates an actual complexity metric. The complexity estimate updater generates an updated complexity metric estimate based on a difference between the complexity metric estimate and the actual complexity metric.

17 Claims, 7 Drawing Sheets

METHOD AND SYSTEM FOR ENCODING VIDEO DATA

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In video communications applications it is often necessary to transmit at a fixed bit rate. Any extra amount of information transmitted beyond this fixed bit rate would be discarded, and transmitting at a lower bit rate would be a waste of bandwidth. When the bandwidth is wasted, video quality is less than ideal. Similarly, preparing a video stream for media storage (e.g. DVD) necessitates the population of a disk to the maximum capacity such that no disk partition is wasted.

During real-time encoding, the actual number of bits output from a video encoder must be fed back to compute deviations in bit rate. These deviations are used by a bit rate controller for future adjustments. With advancements in video encoding, bits output from a video encoder can be delayed by the inherent complexity required for optimum compression. Therefore, a new approach is required for controlling bit rate in a video encoder.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein are rate controllers and methods for rate control for use in encoding video data.

In one embodiment of the invention, a rate controller in a video encoder system is presented. The rate controller is comprised of a complexity estimator, a quantization level selector, a complexity generator, and a complexity estimate updater. The complexity generator generates an actual complexity metric based on true encoder output. The complexity estimator generates a complexity metric estimate that is updated based on a difference between the complexity metric estimate and the actual complexity metric. The quantization level selector sets a quantization level based on the complexity metric estimate.

In another embodiment, a method for rate control is presented. Generate a complexity metric estimate. Set a quantization level based on the complexity metric estimate. Generate an actual complexity metric. Generate an updated complexity metric estimate based on a difference between the complexity metric estimate and the actual complexity metric.

In another embodiment, an integrated circuit for controlling bit rate in a video encoder is presented. The integrated circuit comprises arithmetic logic and memory. The arithmetic logic is operable to calculate an updated complexity metric estimate. The memory is operable to store a set of quantization levels and select a quantization level to be used by the video encoder based on the updated complexity metric estimate.

These and other advantages and novel features of the present invention, as well as illustrated embodiments thereof, will be more fully understood from the following description and drawings.

DETAILED DESCRIPTION OF THE INVENTION

Most video applications use compression of digital video for transmission, storage, and data management. The task of compression is accomplished by a video encoder. The video encoder takes advantage of spatial, temporal, spectral, and statistical redundancies to achieve compression. According to certain aspects of the present invention, a system and method for rate control in a video encoder are presented. Rate control is possible in real-time even while using fixed-point processors.

Figure 1:
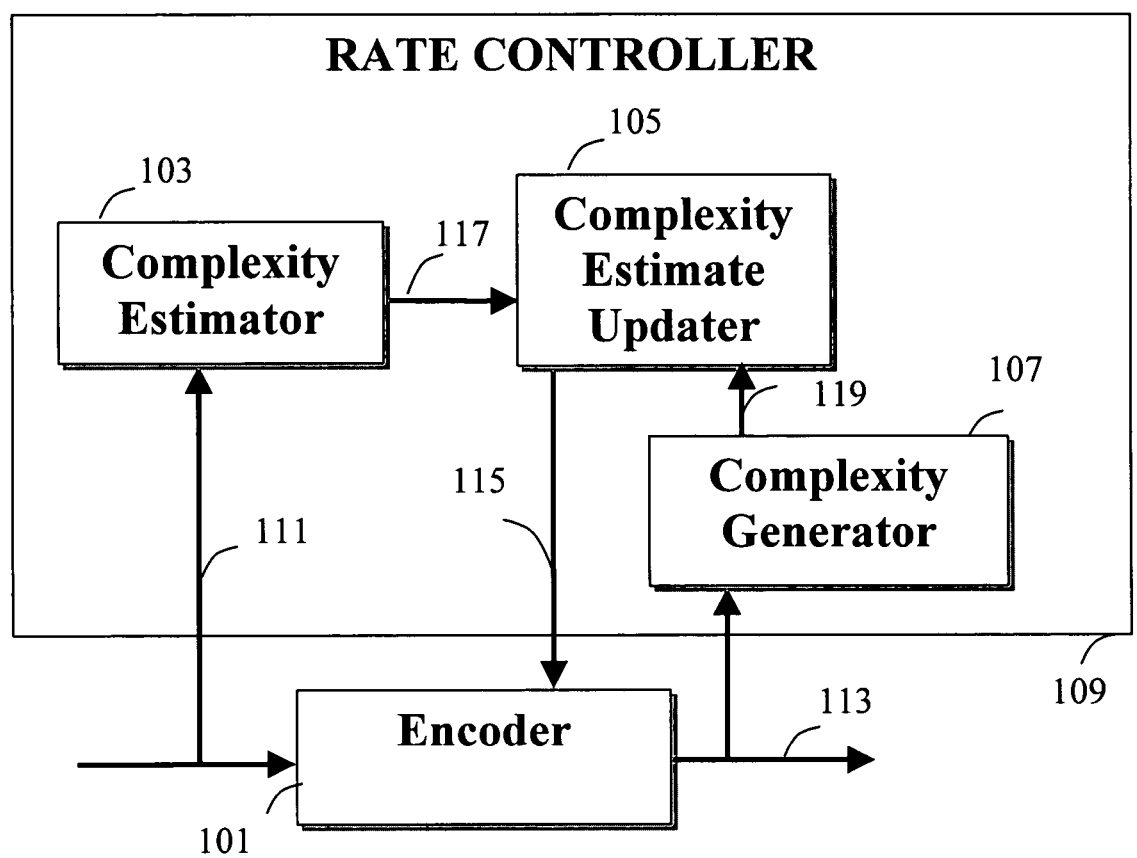
FIG. 1 is a block diagram of an exemplary video system with a rate controller in accordance with an embodiment of the present invention.

In FIG. 1, a block diagram of an exemplary video system 100 with a rate controller 109 is presented. The rate controller 109 comprises a complexity estimator 103, a complexity estimate updater 105, and a complexity generator 107. In addition to the rate controller 109, the video system 100 includes an encoder 101.

Exemplary digital video encoding standards, such those specified by the Moving Picture Experts Group (MPEG), describe encoding on a picture-by-picture basis, and pictures are encoded on a macroblock by macroblock basis. The term picture is used throughout this specification to generically refer to frames, fields, macroblocks, or portions thereof. One or more pictures 111 are input to the encoder 101 and an encoder output 113 is produced. The pictures 111 may be stored in a buffer prior to encoding. To set a bit rate, the encoder 101 requires a quantization level 115. The encoder 101 may be responsible for transformation, quantization, motion estimation, motion compensation, entropy encoding, and inverse transformation.

Typically, it is advantageous to have a current and accurate count of the bits in the encoder output 113 in order to maintain a fixed bit rate. When the encoder 101 is complicated, there could be a processing delay prohibiting a direct count of the bits in the encoder output 113 in real-time. The processing delay can be a function of aspects such as bit rate and picture complexity, and during a scene change, the encoder 101 can require even a longer processing time. The rate controller 109 can be used to measure complexity and select the quantization level 115 that best maintains a desired bit rate. A series of quantization levels may be precomputed and stored in memory.

The complexity generator 107 works directly from the encoder output 113 to produce an actual complexity metric 119. The actual complexity metric 119 may be a bit count or quantization level based on the bit count. When encoder processing is complex, the encoder output 113 will be delayed. Since optimum performance of the rate controller 109 is dependent on current parameters, the actual complexity metric 119 is used as a reference in the rate control prediction.

Within the rate controller 109, the complexity estimator 103 produces a complexity metric estimate 117. A complexity metric may be a bit count or a quantizer level for a particular picture type. One or more complexity metric estimates may be stored in memory. Initial (or nominal) values of the complexity metric estimates may be precomputed for different picture types by the encoder 101. The pictures 111 enter the complexity estimator 103 and a parameter such as picture type or measure of encoding difficulty is determined. The parameter can be dependent on source, number of compressed bits, or quantizer step size.

Complexity metrics estimates are updated based on previously computed complexity metrics. Each pictures type may have a different updater generator. The objective of the update is to minimize future differences in a predicted value of a rate metric vs. an actual value. Examples of functions that can produce an update (U) from a complexity metric estimate (E) and a delta bit number (D) may be:

First Order: $U=a_0(E)+a_1(D)$;
Quadratic: $U=a_0(E)+a_1(D)+a_2(D^2)$; or
Higher Order: $U=a_0(E)+a_1(D)+a_2(D^2) \ldots +a_N(D^N)$.

Coefficients, $a_0, a_1, a_2, \ldots a_N$, can remain constant or adapt to the content of the video in real-time. In the latter case, the coefficients, $a_0, a_1, a_2, \ldots a_N$, can change as the statistical nature of the source changes over time. A smaller coefficient can dampen (or filter) short-term complexity metric fluctuations.

The function may keep useful operating points and discard unnecessary data. For example, points taken from a certain scene should not be used to update in another scene, and different functions can be adopted to accommodate delays in different picture types. Therefore, complexity is tuned to match the content of the picture. A complexity estimate updater may be designed in arithmetic logic as a co-processor.

Figure 2:
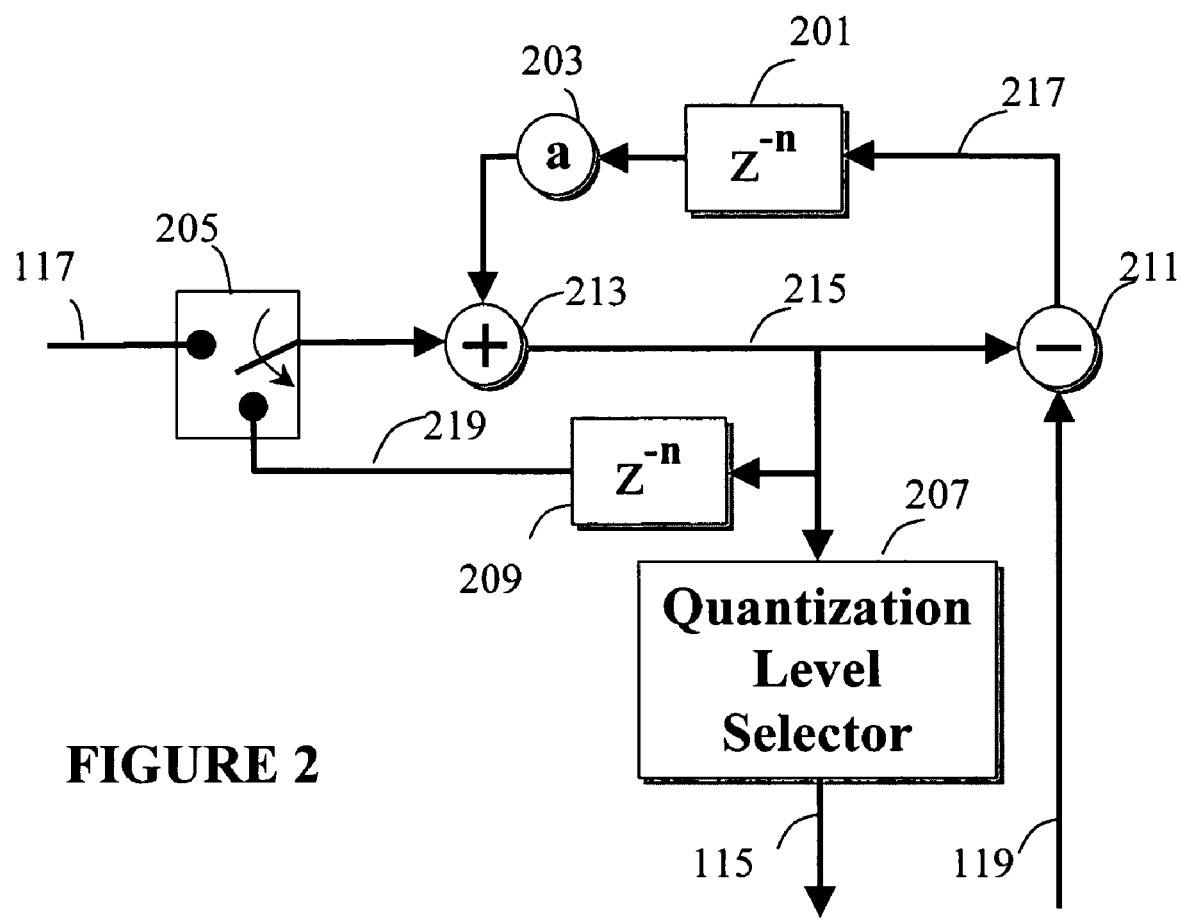
FIG. 2 is a block diagram of a complexity estimate updater in a rate controller in accordance with an embodiment of the present invention.

The complexity metric updater 105 sets the quantization level 115 for the encoder 101 based on the complexity metric estimate 117 and the actual complexity metric 119. The functioning of the complexity metric updater 105 may be better understood with reference to an example complexity metric updater 200 in FIG. 2.

The complexity metric estimate 117 is typically available at the start of encoder processing. A switch 205 may select the complexity metric estimate 117 at the start of a new scene, and once updating begins, a previous estimate 219 that is an intermediate estimate 215 following a delay 209 may be selected.

A subtractor 211 is shown to take the difference between the actual complexity metric 119 and the intermediate estimate 215. This difference is a delta bit number 217. The example complexity metric updater 200 depicts the first order function: Update=(Estimate)+a×(Delta Bits). The delta bit number 217 from the previous update (shown by a delay 201) is scaled by "a" which is typically a value between 0 and 1. This is added to the value selected by the switch 205 to produce the intermediate estimate 215. The intermediate estimate 215 may be a quantization level, or the intermediate estimate 215 may be used to select a quantization level 115 from a quantization level selector 207. These quantization levels are typically precomputed and stored in memory.

At the start of the encoding operation, not many pictures are digested yet and the delta bit number 217 may have large swings. As more pictures are compressed, the delta bit number 217 may settle at a pseudo-constant value, as the delta bit number 217 reaches a local minimum.

All processing blocks of the rate controller may use low resolution integer multipliers and adopt multipliers instead of dividers. This allows a video unit to use a smaller CPU that has low computational resolution. In this video unit design, all inputs and outputs would be defined as integers and calculations are done with integer-point arithmetic. Feedback loops described in reference to the complexity metric updater 105 are stable and reach a local minimum when integer-point arithmetic is utilized.

Figure 3:
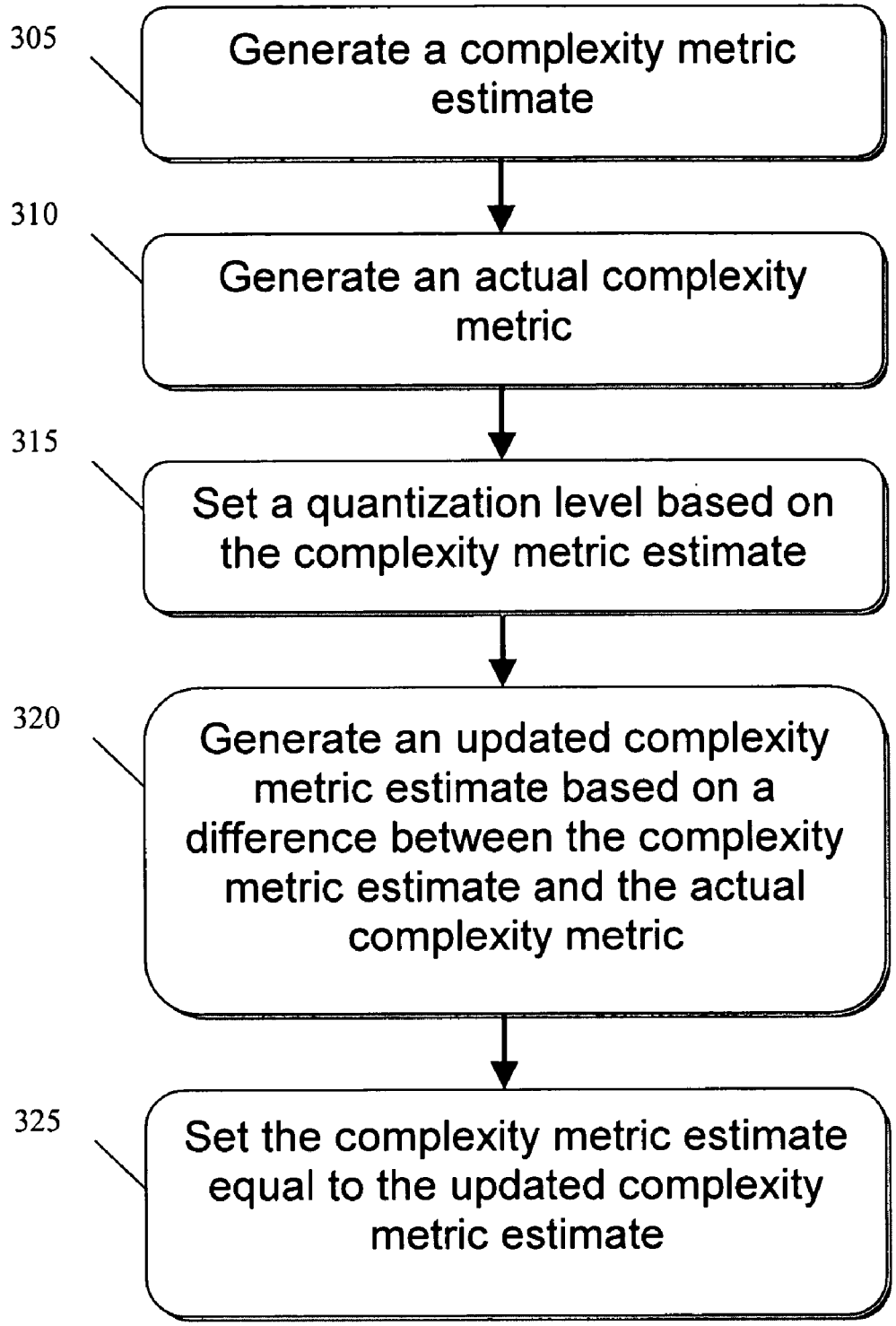
FIG. 3 is a flow diagram of an exemplary method for rate control in accordance with an embodiment of the present invention.

FIG. 3 is a flow diagram of an exemplary method for rate control 300. Generate a complexity metric estimate 305 and generate an actual complexity metric 310. The actual complexity metric is generated based on actual encoded video, but it is usually delayed. This delay cannot be tolerated by the rate controller if there is a tight constraint on a data throughput or bandwidth. The complexity metric estimate is a prediction of what the actual complexity metric will be following an encoder processing delay.

Set a quantization level based on the complexity metric estimate 315. Based on the prediction of the actual complexity metric, the rate controller has an estimate of the number of bits used and can determine the number of bits that can be used in the future.

Generate an updated complexity metric estimate based on a difference between the complexity metric estimate and the actual complexity metric 320. A feedback loop and filtering device are used to reduce rapid fluctuations in bandwidth usage. Set the complexity metric estimate equal to the updated complexity metric estimate 325 to close the feedback in the update routine.

An exemplary compression standard, H.264, will now be described by way of example to illustrate both data interdependent portions of the video data, and independent portions of the video data. This will be followed by application of the present invention in the context of H.264. Although the H.264 standard is described, the present invention is not limited to the H.264 standard and can be used with other standards as well.

H.264 Standard

Figure 4:
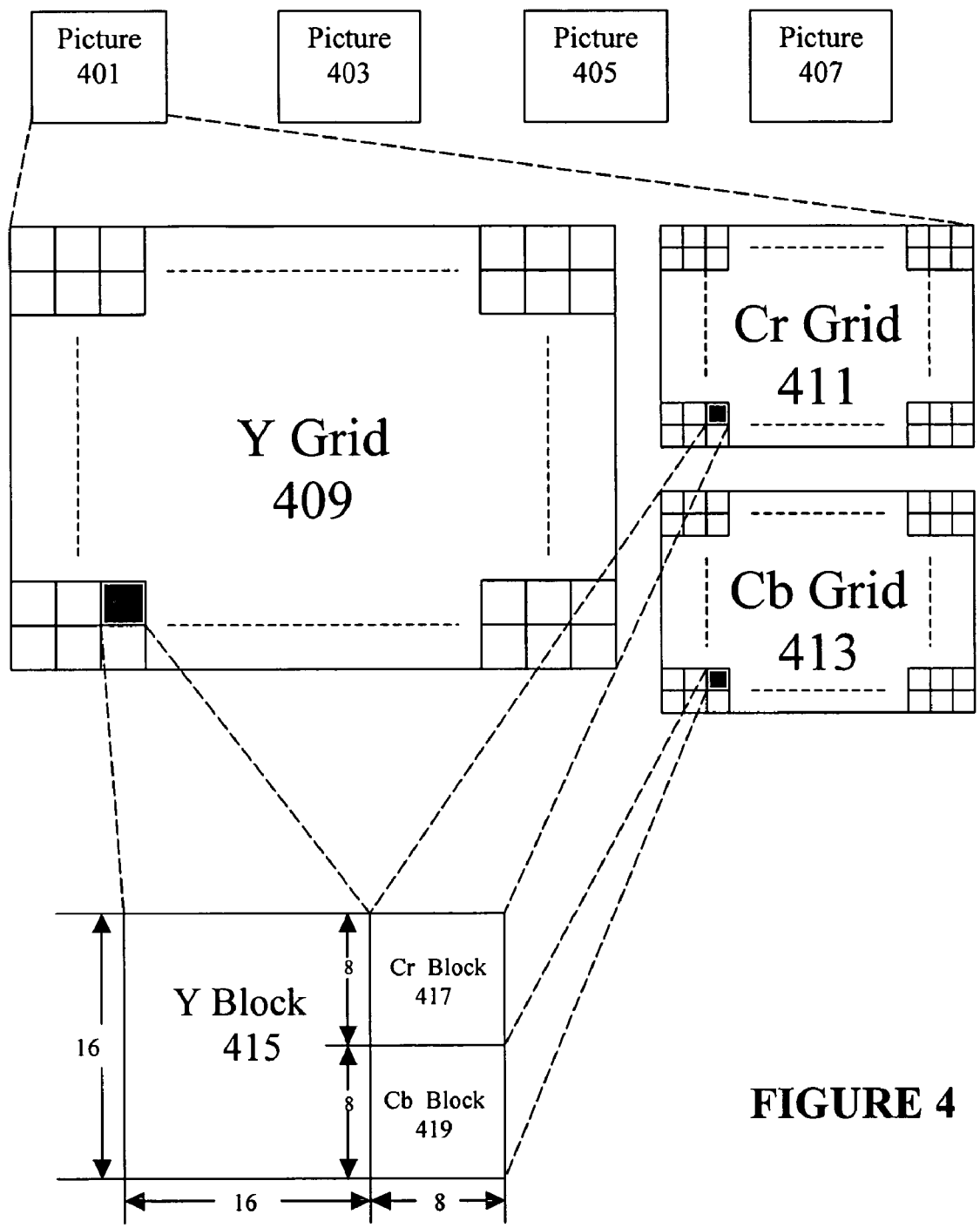
FIG. 4 is a block diagram of a picture.

Referring now to FIG. 4, there is illustrated a block diagram of a picture 401. The term picture may refer to: a progressive frame (e.g. Film, animation, etc. . . . ), a top field of an interlaced frame, a bottom field of an interlaced frame, or two fields interleaved together to form an interlaced frame.

The picture 401 along with successive pictures 403, 405, and 407 form a video sequence. The picture 401 comprises two-dimensional grid(s) of pixels. For color video, each color component is associated with a unique two-dimensional grid of pixels. For example, a video can include a luma, chroma red, and chroma blue components. Accordingly, these components are associated with a luma grid 409, a chroma red grid 411, and a chroma blue grid 413. When the grids 409, 411, 413 are overlayed on a display device, the result is a picture of the field of view at the duration that the picture was captured.

Generally, the human eye is more perceptive to the luma characteristics of video, compared to the chroma red and chroma blue characteristics. Accordingly, there are more pixels in the luma grid 409 compared to the chroma red grid 411 and the chroma blue grid 413. In the MPEG 4:2:0 standard, the chroma red grid 411 and the chroma blue grid 413 have half as many pixels as the luma grid 409 in each direction. Therefore, the chroma red grid 411 and the chroma blue grid 413 each have one quarter as many total pixels as the luma grid 409.

The luma grid 409 can be divided into 16×16 pixel blocks. For a luma block 415, there is a corresponding 8×8 chroma red block 417 in the chroma red grid 411 and a corresponding 8×8 chroma blue block 419 in the chroma blue grid 413. Blocks 415, 417, and 419 are collectively known as a macroblock that can be part of a slice group.

Spatial Prediction

Figure 5A:
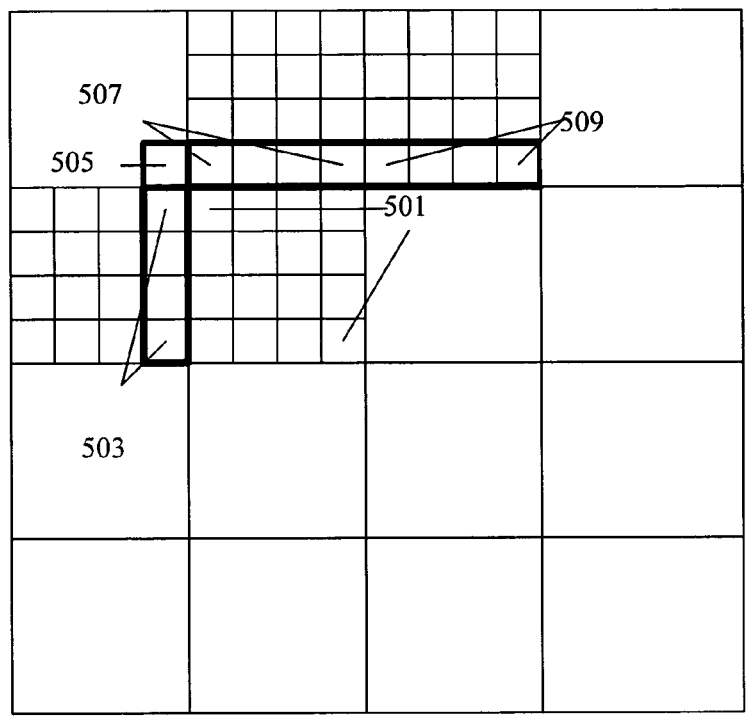
FIG. 5A is a block diagram describing spatially encoded macroblocks.

Referring now to FIG. 5A, there is illustrated a block diagram describing spatially encoded macroblocks. Spatial prediction, also referred to as intraprediction, involves prediction of picture pixels from neighboring pixels. The pixels of a macroblock can be predicted, in a 16×16 mode, an 8×8 mode, or a 4×4 mode. A macroblock is encoded as the combination of the prediction errors E representing its partitions.

In the 4×4 mode, a macroblock 501 is divided into 4×4 partitions. The 4×4 partitions of the macroblock 501 are predicted from a combination of left edge partitions 503, a corner partition 505, top edge partitions 507, and top right partitions 509. The difference between the macroblock 501 and prediction pixels in the partitions 503, 505, 507, and 509 is known as the prediction error. The prediction error is encoded along with an identification of the prediction pixels and prediction mode.

Temporal Prediction

A temporally encoded macroblocks can be divided into 16×8, 8×16, 8×8, 4×8, 8×4, or 4×4 partitions. Each partition of a macroblock, is compared to one or more prediction partitions in another picture(s). The difference between the partition and the prediction partition(s) is known as the prediction error. A macroblock is encoded as the combination of the prediction errors representing its partitions. The prediction error is encoded along with an identification of the prediction partition(s) that are identified by motion vectors. Motion vectors describe the spatial displacement between partitions.

Figure 5B:
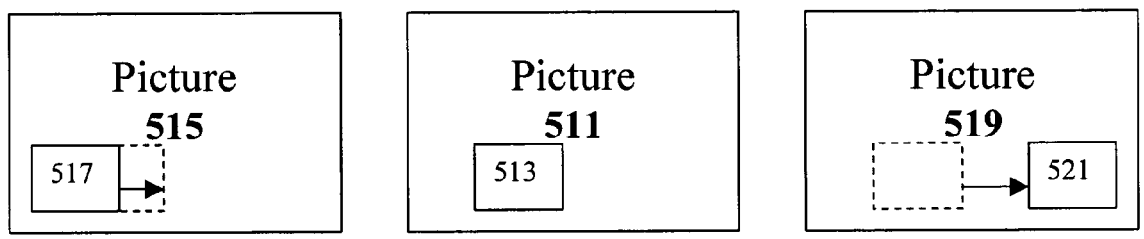
FIG. 5B is a block diagram describing temporally encoded macroblocks.

Referring now to FIG. 5B, there is illustrated a block diagram describing temporally encoded macroblocks. In bi-directional coding, a first partition 513 in a first picture 511 that is being coded is predicted from a second partition 517 in a second picture 515 and a third partition 521 in a third picture 519. Accordingly, a prediction error is calculated as the difference between the weighted average of the prediction partitions 517 and 521 and the partition 513 in a first picture 511. The prediction error and an identification of the prediction partitions are encoded. The prediction partitions are identified by motion vectors.

The weights can also be encoded explicitly, or implied from an identification of the picture containing the prediction partitions. The weights can be implied from the distance between the pictures containing the prediction partitions and the picture containing the partition.

Transformation, Quantization, and Scanning

Figure 5C:
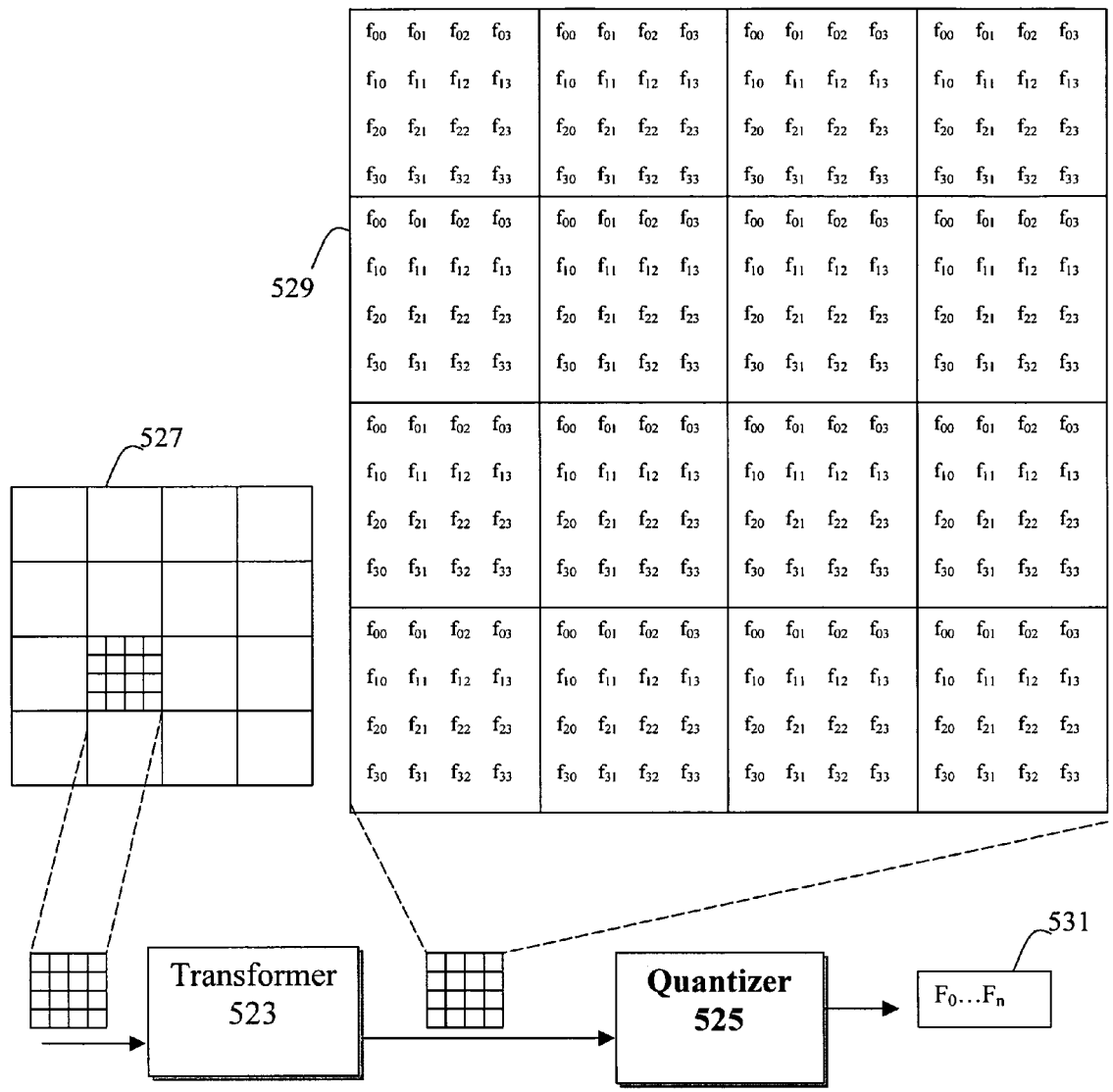
FIG. 5C is a block diagram describing the encoding of a prediction error.

Referring now to FIG. 5C, there is illustrated a block diagram describing the encoding of the prediction error. A macroblock is encoded as the combination of its partitions. A macroblock is represented by an error for both spatial prediction and temporal prediction. The prediction error is also a two-dimensional grid of pixel values for the luma Y, chroma red Cr, and chroma blue Cb components with the same dimensions as the macroblock.

The transformer 523 transforms 4×4 partitions of the prediction error 527 to the frequency domain, thereby resulting in corresponding sets of frequency coefficients 529. The sets of frequency coefficients 529 are then passed to a quantizer 525 and scanned, resulting in set of quantized frequency coefficients, $F_0 \ldots F_n$ 531. The quantizer 525 can be programmed with a variable quantization level as described in FIG. 2 with reference to the quantization level selector 207.

Figure 6:
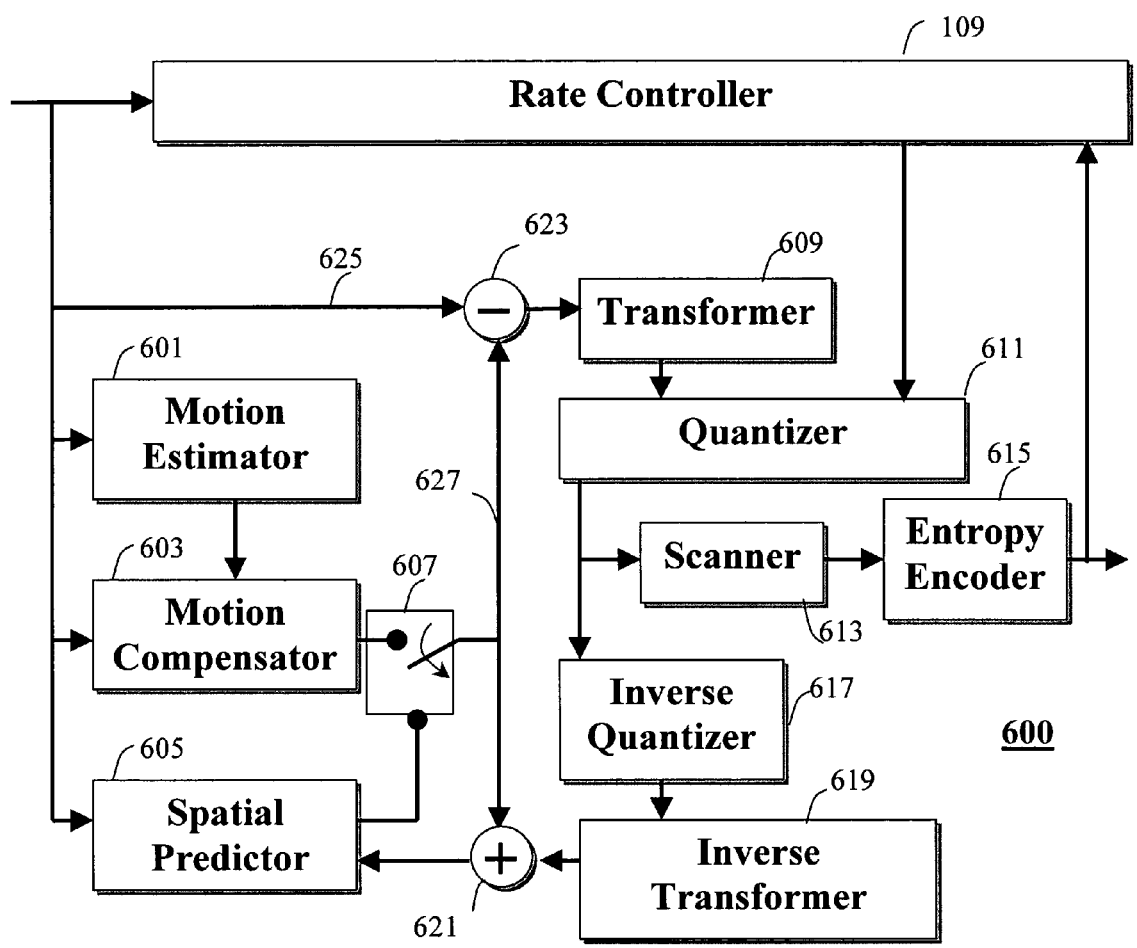
FIG. 6 is a video encoder in accordance with another embodiment of the present invention.

Referring now to FIG. 6, there is illustrated a block diagram describing an exemplary video encoder 600 in accordance with an embodiment of the present invention. The video encoder 600 encodes video data 625 comprising a set of pictures. The video encoder 600 comprises a motion estimator 601, a motion compensator 603, a spatial predictor 605, a transformer 609, a quantizer 611, a scanner 613, an entropy encoder 615, an inverse quantizer 617, and an inverse transformer 619. The foregoing can comprise hardware accelerator units under the control of a CPU.

When video data 625 is presented for encoding, the video encoder 600 processes in units of macroblocks. The video encoder 600 can encode each macroblock using either spatial or temporal prediction. In each case, the video encoder forms a prediction block 627 that can be selected by a switch 607. In spatial prediction mode, the spatial predictor 605 forms the prediction block 627 from samples of the current picture 625 and one that was previously encoded. In temporal prediction mode, the motion estimator 601 and motion compensator 603 form a prediction macroblock 627 from one or more reference pictures. Additionally, the motion estimator 601 and motion compensators 603 provide motion vectors identifying the prediction block. The motion vectors can also be predicted from motion vectors of neighboring macroblocks.

A subtractor 623 subtracts the prediction macroblock 627 from the macroblock in the current picture 625, resulting in a prediction error. The transformer 609 and quantizer 611 transform and quantize the prediction error, resulting in a set of quantized transform coefficients. The scanner 613 reorders the quantized transform coefficients. The entropy encoder 615 encodes the coefficients.

With reference to FIG. 1 and FIG. 6, the rate controller 109 can be used to measure complexity and select the quantization level 115 that best maintains a desired bit rate. A series of quantization levels may be precomputed and stored in memory. The storage and selection of the quantization levels may occur in the rate controller 109 or the quantizer 611.

The video encoder also decodes the quantized transform coefficients, via the inverse quantizer 617 and the inverse transformer 619. The decoded transform coefficients are added 621 to the prediction macroblock 627 and used by the spatial predictor 605.

The embodiments described herein may be implemented as a board level product, as a single chip, application specific integrated circuit (ASIC), or with varying levels of a video classification circuit integrated with other portions of the system as separate components.

The degree of integration of the video classification circuit will primarily be determined by the speed and cost considerations. Because of the sophisticated nature of modern processors, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware as instructions stored in a memory. Alternatively, the functions can be implemented as hardware accelerator units controlled by the processor.

Limitations and disadvantages of conventional and traditional approaches will become apparent to one of ordinary skill in the art through comparison of such systems with the present invention as set forth in the remainder of the present application with reference to the drawings.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope.

Therefore, it is intended that the present invention not be limited to the particular embodiment disclosed, but that the present invention will include all embodiments falling within the scope of the appended claims.

The invention claimed is:

1. A method for encoding video data, said method comprising:
   encoding a portion of the video data;
   generating a metric, said metric measuring complexity of the portion of the video data; and
   encoding another portion of the video data, wherein a rate of encoding said another portion of the video data is based on the metric, wherein generating the metric is comprised of:
   generating a complexity metric estimate;
   generating an actual complexity metric; and
   generating the metric based on a difference between the complexity metric estimate and the actual complexity metric.

2. The method of claim 1, wherein generating the complexity metric estimate is comprised of:
   selecting an initial complexity metric from one or more nominal complexity metrics.

3. The method of claim 1, wherein generating an actual complexity metric is comprised of:
   counting a number of bits in an encoder output.

4. The method of claim 1, wherein generating the metric comprises:
   generating a product from the multiplication of the difference by a value; and
   generating the metric by adding the product to the complexity metric estimate.

5. The method of claim 1, wherein encoding another portion of the video data is comprised of:
   setting a quantization level based on the metric; and
   encoding another portion of the video data, wherein the rate of encoding said another portion of the video data is based on the quantization level.

6. The method of claim 5, wherein setting the quantization level is comprised of:
   selecting the quantization level from one or more stored quantization levels.

7. A system for encoding video data comprising:
   an encoder for encoding the video data, wherein the video data comprises a first portion and a second portion; and
   a metric generator for generating a metric, said metric measuring complexity of the first portion of the video data;
   wherein the rate of encoding said second portion of the video data is based on the metric, wherein the metric generator comprises:
   a complexity estimator for generating a complexity metric estimate;
   a complexity generator for generating an actual complexity metric; and
   a complexity estimate updater for generating the metric based on a difference between the complexity metric estimate and the actual complexity metric.

8. The system of claim 7, wherein the complexity estimator receives one or more nominal complexity metrics from an encoder.

9. The system of claim 7, wherein the complexity generator generates the actual complexity metric from a count of bits in an encoder output.

10. The system of claim 7, wherein the complexity estimate updater comprises:
    a multiplier for multiplying the difference by a value, thereby generating a product; and
    an adder for adding the product to the complexity metric estimate, thereby generating the metric.

11. The system of claim 10, wherein the value is adjusted over time.

12. The system of claim 7, wherein the metric generator comprises:
    a quantization level selector for setting a quantization level based on the metric.

13. The rate controller of claim 12, wherein the quantization level selector stores one or more predetermined quantization levels.

14. An integrated circuit for encoding video data, said integrated circuit comprising:
    memory for storing a metric and the video data, wherein the video data comprises a first portion and a second portion; and
    arithmetic logic operable to:
    a) receive the video data
    b) encode the first portion based on the metric;
    c) update the metric based on the complexity of the first portion; and
    d) encode the second portion based on an updated metric; and
    wherein the updated metric is a sum of a product and the metric, wherein the product is generated by scaling a difference between the metric and an actual complexity metric.

15. The integrated circuit of claim 14, wherein the metric is used to select a quantization level that controls a rate of encoding.

16. The integrated circuit of claim 14, wherein the memory further stores one or more initial metrics generated by an encoder.

17. The integrated circuit of claim 14, wherein the scaling is adjusted over time.

* * * * *